Richards & Vandergrift.
Plow.
No. 3.098. Reissued Aug 25 1868.
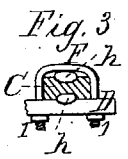
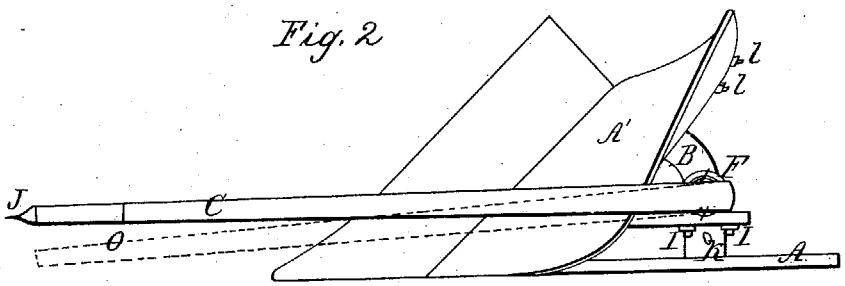
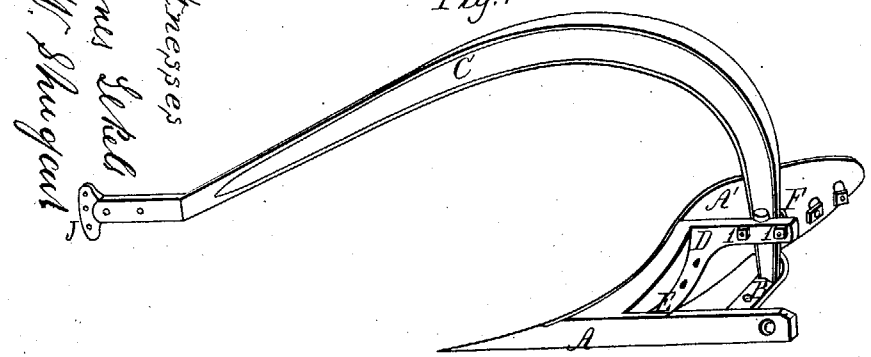
Witnesses
James Lekels
G. W. Shugart
Inventor
Merritt Richards
J. Vandergrift
By their attorney
Geo. L. Chapin
N. PETERS, PHOTO-LITHOGRAPHER, WASHINGTON, D. C.

UNITED STATES PATENT OFFICE.

M. RICHARDS AND J. VANDEGRIFT, OF PRINCETON, ILLINOIS.

IMPROVEMENT IN PLOWS.

Specification forming part of Letters Patent No. 61,762, dated February 5, 1867; Reissue No 3,098, dated August 25, 1868.

*To all whom it may concern:*

Be it known that we, M. RICHARDS and J. VANDEGRIFT, of Princeton, in the county of Bureau, in the State of Illinois, have invented a new and useful Improvement in Plows; and we do hereby declare that the following is a full and exact description thereof, reference being had to the accompanying drawings, and to the letters of reference marked thereon, making a part of this specification, in which—

Figure 1 is a perspective representation of our improved plow; Fig. 2, a plan view of the same; Fig. 3, a section of the beam, and also a section of the arm which supports the same, and the devices which hold the beam after it has been turned, so as to cut a furrow of the desired width.

The nature of our invention consists, first, in the use of a double-concave wrought-iron beam, pivoted to the plow, for which we claim the advantage of lightness and strength, not now secured by the use of other beams, whether cast or wrought, and one which may be turned on the pivot, and thus set the plow to run to and from the land without the use of a clevis; second, in the arrangement of a foot-support for staying the landside and mold-board, and providing a permanent pivot-seat for the rear end of the beam to rest upon; third, in providing an arm extending out from the mold-board for the purpose of providing additional support for the beam, and clamping it firmly in position after it has been set to gage the plow to cut the desired width of furrow; fourth, in the use of suitable fillings or plugs fitted to the concave sides of the plow-beam, in order that the required pressure may be had against its sides in order to hold it in position when once set.

The advantage to be gained by the use of our invention is, first, a beam can be made of wrought-iron, rolled the required shape, which will be much lighter than those now in use, and yet possess all of the strength required for the purpose desired, and the beam can be turned on the pivot, so as to run the plow to cut a furrow of any required width with much less trouble than with the common clevis; and, further, the landside and mold-board being securely fastened together, the strain on the plow is not so great as when it is constructed according to the present plans.

To enable others skilled in the art to make and use our plow, we have marked corresponding parts with similar letters, and will now give a detailed description.

A A′ represent the landside and mold-board of a common plow.

B shows the foot-support or brace, which is used for the double purpose of supporting the lower end of the beam C and strengthening the landside A and mold-board A′, to which it is attached, by bolts or otherwise, in a substantial manner, and has a vertical hole near the middle and in a convenient place for receiving a pivot made on the lower end of the rear part of the beam C.

D is the arm supporting the beam C near the top of the mold-board A′. This arm has an elbow, which passes down and against the cutter-edge of the mold-board A′, near its top, to which it is rigidly attached, as seen at E, Fig. 1.

F represents the clamp which holds the beam C firmly against the arm D. It will be seen at Fig. 3 that the beam C passes through the clamp F and has the plugs *h* fitted in both sides of the concave beam. These plugs are important in not only assisting to hold the beam, but allow it to be swung such a distance to or from the land as will regulate the width of furrow to be turned.

In order to give a correct understanding of the benefit of this device, we will refer to the position of the beam C at Fig. 2. This beam in this figure is set to run the plow so as to cut a wide furrow; but the dotted lines O show how the beam C may be moved toward the landside A, so as to cut a furrow of less width. In order to accomplish this, the bolts I, securing the clamp F, must be loosened, so that the beam can be turned as far as desired, after which the nuts can be tightened securely, and the beam C will be properly set for the required gage.

In order to make the plow complete, one of the handles can be put through a hole, K, and the other bolted fast at U on the mold-board A′. The power can be applied at the end of the beam C at J in the usual manner.

Having thus described our invention, what we claim, and desire to secure by Letters Patent of the United States, is—

1. Broadly, the beam C, pivoted to the brace B, and arranged to turn, substantially as and for the purpose herein specified.

2. The combination of the beam C, support and brace B, landside A, and mold-board A′, as set forth.

3. The arm D, in combination with the beam C, plugs *h*, clamp F, and mold-board A′, as described and set forth.

M. RICHARDS.
J. VANDEGRIFT.

Witnesses:
H. M. TRIMBLE,
GEO. L. PADDOCK.